Aug. 3, 1954 R. B. EDELMANN 2,685,196
HYDROMETER
Filed March 26, 1951
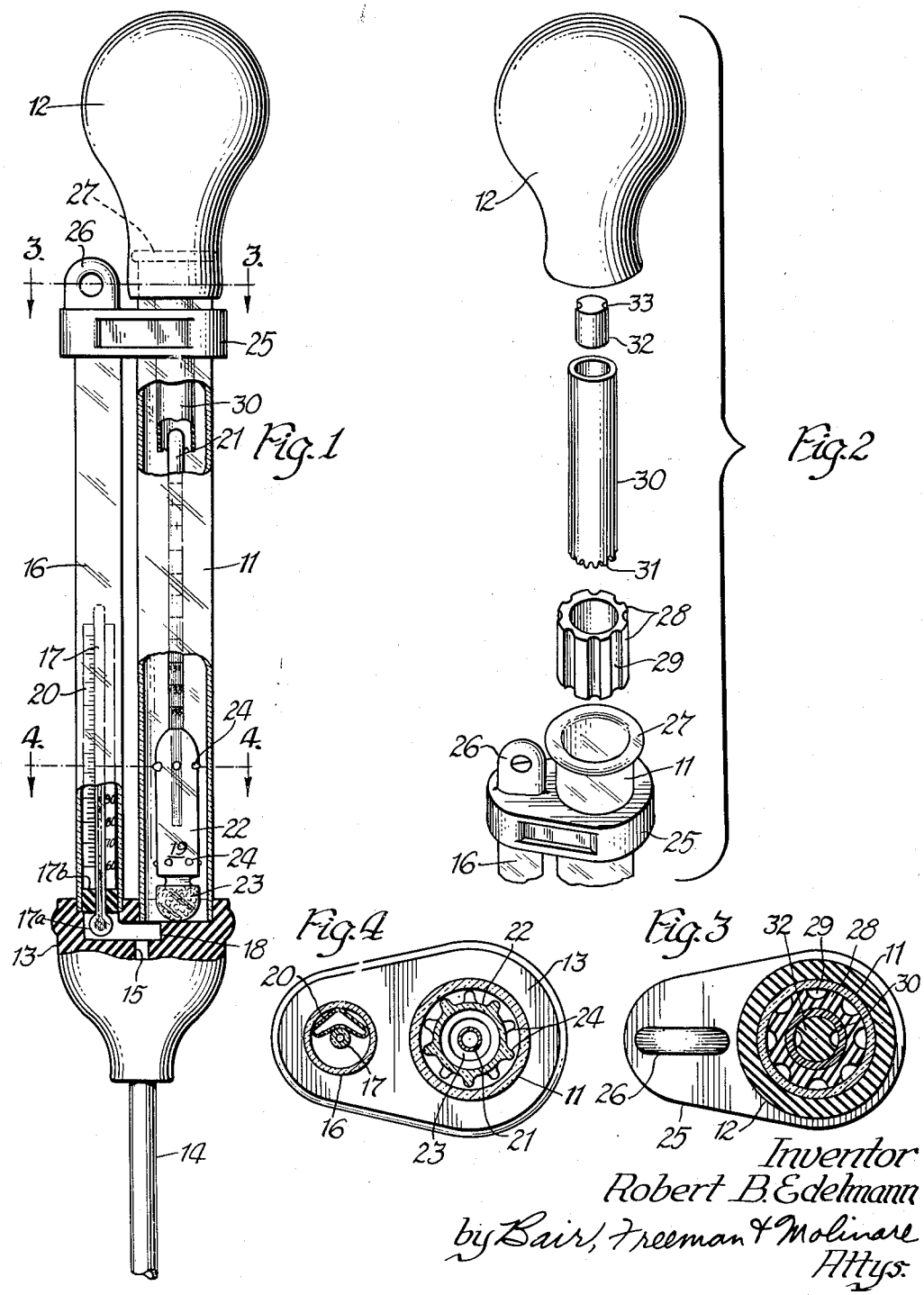
Inventor
Robert B. Edelmann
by Bair, Freeman & Molinare
Attys.

Patented Aug. 3, 1954

2,685,196

UNITED STATES PATENT OFFICE 2,685,196

HYDROMETER

Robert B. Edelmann, Chicago, Ill., assignor to E. Edelmann & Co., Chicago, Ill., a corporation of Illinois Application March 26, 1951, Serial No. 217,600

3 Claims. (Cl. 73—34)

This invention relates to hydrometers for testing the specific gravity of liquids, such as the liquids found in internal combustion engine radiators or electric storage batteries.

It is an object of the invention to provide an improved hydrometer construction wherein the float is properly centered and the likelihood of breakage of the float or the glass surrounding the same is greatly decreased.

It is another object of the invention to prevent the float or the transparent barrel containing the float from breaking because of the float bumping against the barrel.

It is an additional object of the invention to provide a hydrometer construction wherein the upper end of the hydrometer float is prevented from bumping the hydrometer barrel in a manner which greatly reduces the possibility of breaking the delicate stem of the hydrometer.

It is a further object of the invention to provide upper and lower guide means for the float of a hydrometer, which tend to keep the hydrometer float in a vertical position and also decrease the possibility of breakage of both the float and the hydrometer barrel.

It is an additional object of the invention to provide a guide for the upper end of a hydrometer float which is formed of a plastic material and also to construct such a guide so that it will not retain liquid.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a vertical view of a hydrometer constructed in accordance with my invention, with parts thereof broken away for the sake of clarity;

Figure 2 is an exploded perspective view of the upper portion of the hydrometer shown in Figure 1;

Figure 3 is a sectional view of the hydrometer taken on line 3—3 of Figure 1; and Figure 4 is a sectional view of the hydrometer taken on line 4—4 of Figure 1.

Referring specifically to the drawing for a detailed description of the invention, numeral 11 designates a transparent barrel for the hydrometer, which barrel is usually formed of glass. A rubber bulb 12 is secured to the upper open end of the barrel 11 in order to create a suction in the barrel to draw liquid into the barrel or to expel liquid therefrom. Numeral 13 designates a base member preferably formed of soft rubber which is secured to the lower open end of the hydrometer barrel. The rubber base 13 is provided with a rubber hose 14, which hose is adapted to be inserted into the liquid to be tested. The rubber hose 14 communicates with a passage 15 in the base 13 and also with a horizontal passage 18 formed in the base 13.

The hydrometer shown in the drawing also includes a glass barrel 16 which contains a thermometer 17, the thermometer being supported by a triangular piece of material 20. The thermometer 17 is provided with a bulb 17a which extends into the horizontal passage 18 in base 13. A stopper 17b separates the bulb 17a from the upper end of the thermometer 17. It is obvious that liquid drawn into the passages 15 and 18 will be drawn into the barrel 11 and will also contact the bulb 17a of the thermometer 17, so that the thermometer will indicate the temperature of the liquid to be tested. It is necessary to ascertain the temperature of the liquid to be tested so that correction can be made and the proper specific gravity determined.

A hydrometer float is generally indicated by the numeral 19 and comprises an elongated thin upper stem 21 which is preferably made of glass, as is the hydrometer float 22. The hydrometer 19 is also provided with a weighted base 23 and the float 22 is provided with a plurality of projections 24 adjacent the upper and lower portions of the float. The projections 24 are spaced a relatively small distance from the internal surface of the barrel 11.

A rubber collar 25 is provided at the upper ends of the barrels 11 and 16 and retains the two in properly spaced relation. The collar 25 is provided with an eyelet 26 so that the hydrometer may be placed on a nail or hook for storage.

As best shown in Figure 2, the upper end of the barrel 11 is provided with a lip 27. A soft rubber bushing 28, having convolutions 29 in its outer surface, is inserted into the top of the barrel 11 and fits snugly therein. A tube 30, preferably formed of a thermoplastic material, such as Vinylite, is inserted into the bushing 28 and fits snugly therein. The tube 30 extends into the barrel 11 for a considerable distance sufficient to surround the upper end of the stem 21 of float 19 even when the float is in its lowermost position, as shown in Figure 1. As the float 19 rises, the stem also rises in the tube 30.

A plug 32 is inserted snugly into the upper end of the tube 30 and is provided with passages 33 so that air may be sucked into and expelled from the barrel 11 by the rubber bulb 12.

In the operation of the hydrometer, the tube 14 is inserted into the liquid to be tested and the bulb 12 is compressed and then allowed to expand, thus drawing the liquid to be tested through the passages 15 and 18, into contact with the bulb 17a of the thermometer 17 and into the barrel 11. The thermometer 17 will then register the temperature of the liquid and the hydrometer float 19 will rise a distance depending upon the specific gravity of the liquid to be tested. As the float 19 rises, it has a tendency to wobble in the barrel 11 and heretofore many float stems or barrels were broken because of the float bumping against the barrel. However, in the construction shown, the stem 21 will bump against the plastic tube 30 which is considerably less brittle and more shock absorbent than glass and, as a result, there is little likelihood of the stem 21 breaking or of the barrel 11 being fractured. Furthermore, the plastic guide member or tube 30 cooperates with the projections 24 on the float member 22 to maintain the entire hydrometer float 19 in an upright position. The projections 24 also limit the movement of the bottom of the hydrometer float 19 so that there is less likelihood of it striking the barrel with a hard blow, thus assisting in eliminating breakage.

It will be noted that the bottom of the plastic tube 30 is provided with serrations as shown at 31, the purpose of the serrations being to prevent liquid which may rise into the tube 30 from being retained therein. In other words, the serrations 31 prevent the liquid from being retained in the tube by surface tension.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A hydrometer for testing the specific gravity of liquids comprising a transparent barrel having openings at its upper and lower ends, a base member secured to said barrel and having a passage therein for liquids to be tested communicating with the bottom of said barrel, a collapsible bulb secured to the upper end of the barrel to draw liquids into and expel liquids from said barrel, a float in said barrel having a float member and an upwardly extending stem with indicia thereon for indicating specific gravity secured to said float member and a tubular guard encompassing the upper end of the stem, said guard having serrations on its lower edge.

2. A hydrometer for testing the specific gravity of liquids comprising a transparent barrel having openings at its upper and lower ends, a base member secured to said barrel and having a passage therein for liquids to be tested communicating with the bottom of said barrel, a collapsible bulb secured to the upper end of the barrel to draw liquids into and expel liquids from said barrel, a float in said barrel having a float member and an upwardly extending stem with indicia thereon for indicating specific gravity secured to said float member and a tubular guard encompassing the upper end of the stem, said guard being retained in said barrel by a fluted sleeve of soft resilient material on the upper end thereof and engaging the inner wall of the barrel.

3. A hydrometer for testing the specific gravity of liquids comprising a transparent barrel having openings at its upper and lower ends, a base member secured to said barrel and having a passage therein for liquids to be tested communicating with the bottom of said barrel, a collapsible bulb secured to the upper end of the barrel to draw liquids into and expel liquids from said barrel, a float in said barrel having a float member and an upwardly extending stem with indicia thereon for indicating specific gravity secured to said float member, a tubular guard encompassing the upper end of the stem, said guard being retained in said barrel by a fluted sleeve of soft resilient material on the upper end thereof and engaging the inner wall of the barrel, and a stopper of soft resilient material disposed in the upper end of said guard and having passages therethrough communicating with said bulb and the interior of said guard.

References Cited in the file of this patent

UNITED STATES PATENTS

| Number | Name | Date |
| --- | --- | --- |
| 1,390,858 | Amerman | Sept. 13, 1921 |
| 1,424,108 | Luthy | July 25, 1922 |
| 1,817,676 | Christie et al. | Aug. 4, 1931 |
| 2,162,020 | Johnson | June 13, 1939 |
| 2,537,825 | Hardin | Jan. 9, 1951 |

FOREIGN PATENTS

| Number | Country | Date |
| --- | --- | --- |
| 212,759 | Great Britain | Mar. 20, 1924 |